United States Patent
Jiang

(10) Patent No.: US 10,234,933 B2
(45) Date of Patent: Mar. 19, 2019

(54) INFORMATION PROCESSING METHOD AND FIRST ELECTRONIC DEVICE

(71) Applicants: Beijing Lenovo Software LTD., Beijing (CN); Lenovo (Beijing) Limited, Beijing (CN)

(72) Inventor: Xingping Jiang, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 32 days.

(21) Appl. No.: 14/229,081

(22) Filed: Mar. 28, 2014

(65) Prior Publication Data

US 2015/0185823 A1     Jul. 2, 2015

(30) Foreign Application Priority Data

Dec. 27, 2013   (CN) .......................... 2013 1 0741879

(51) Int. Cl.
  *G06F 3/01*    (2006.01)
  *G06F 3/0487*  (2013.01)

(52) U.S. Cl.
  CPC .............. *G06F 3/01* (2013.01); *G06F 3/017* (2013.01); *G06F 3/0487* (2013.01)

(58) Field of Classification Search
  CPC ... H04L 67/06; G06F 3/04842; G06F 3/0346; G06F 3/0488; G06F 3/0484;
  (Continued)

(56) References Cited

U.S. PATENT DOCUMENTS

2007/0124372 A1* 5/2007 Liu .................. G06F 3/023
                                                   709/204
2010/0151880 A1* 6/2010 Jang ................. H04L 51/38
                                                   455/456.1

(Continued)

FOREIGN PATENT DOCUMENTS

CN   102160366 A   8/2011
CN   102685318 A   9/2012

OTHER PUBLICATIONS

First Office Action, including Search Report, for Chinese Patent Application No. 201310741879.0, dated Feb. 6, 2016, 9 pages.

(Continued)

*Primary Examiner* — Robert J Michaud
(74) *Attorney, Agent, or Firm* — Westman, Champlin & Koehler, P.A.

(57) ABSTRACT

An information processing method is applied in a first electronic device, which includes a display screen and a communication interface. In the method, the first electronic device is connected to a second electronic device through the communication interface; object data is acquired from the second electronic device; a display form is determined for displaying the object data on the display screen according to a parameter of the object data. An object navigation interface is generated based on the object data and displayed on the display screen when the second electronic device is in a first device posture. Each object on the second electronic device can be searched and displayed on the display screen through the object navigation interface. An object corresponding to the object data is displayed on the display screen based on the object data when the second electronic device is in a second device posture.

15 Claims, 7 Drawing Sheets

(58) Field of Classification Search
CPC ...... G06F 3/0486; G06F 3/0304; G06F 3/041; G06F 3/042; G06F 3/01; G06F 3/14; G06F 3/04883; G06F 2200/1637; G06F 3/0412; G06F 3/02; G06F 3/021; G06F 3/0227

See application file for complete search history.

(56) References Cited

U.S. PATENT DOCUMENTS

| | | | | |
|---|---|---|---|---|
| 2011/0163944 A1* | 7/2011 | Bilbrey | .................. | G01D 21/02 345/156 |
| 2012/0208466 A1* | 8/2012 | Park | ..................... | G06F 1/1601 455/41.3 |

OTHER PUBLICATIONS

Second Office Action for Chinese Patent Application No. 201310741879.0, dated Oct. 8, 2016, 8 pages.

* cited by examiner

INFORMATION PROCESSING METHOD AND FIRST ELECTRONIC DEVICE

CROSS-REFERENCE TO RELATED APPLICATION

This Application is a non-provisional Application of Chinese Application No. CN 201310741879.0, filed Dec. 27, 2013, in Chinese, the contents of which are hereby incorporated by reference in their entirety.

TECHNICAL FIELD

The present invention relates to information technology, and more particularly, to information processing methods and first electronic devices.

BACKGROUND

With the development of electronic technology, a growing number of electronic products are introduced to people's lives, bringing great convenience to people's works, studies and entertainments. For example, people can make a call, send emails, play a slideshow, watch movies etc. using a smart phone, a tablet computer etc.

In order to share files stored in a second electronic device or transmit the files in the second electronic device to a first electronic device, a conventional solution is that the first electronic device is connected to the second electronic device through Bluetooth, data lines etc., and a user selects files to be transmitted or shared in the second electronic device and then clicks a confirm key to completing file transmission or sharing.

However, the inventors of the present application found at least the following problems with the above technology in the process of implementing the inventive technical solutions of the embodiments of the present application.

In the conventional technology, data transfer between electronic devices is implemented only by clicking manually, and therefore there is only a single approach for data transfer.

SUMMARY

Embodiments of the present application provide an information processing method and a first electronic device capable of solving the problem in the conventional technology that there is only a single approach for data transfer, and providing multiple approaches for data transfer.

In a first aspect, an embodiment of the present application provides an information processing method applied in a first electronic device which comprises a display screen and a communication interface, the method comprising:

connecting to a second electronic device through the communication interface;

acquiring object data from the second electronic device; and determining a display form for displaying the object data on the display screen according to a parameter of the object data;

wherein when the parameter is a first parameter representing that the second electronic device is in a first device posture, an object navigation interface is generated based on the object data and displayed on the display screen, wherein through the object navigation interface, each object on the second electronic device can be searched and displayed on the display screen, and when the parameter is a second parameter representing that the second electronic device is in a second device posture, an object corresponding to the object data is displayed on the display screen based the object data;

wherein the first device posture is different from the second device posture, and each of the first and second device postures is a device posture of the second electronic device relative to the display screen.

Alternatively, when the parameter is a first parameter representing that the second electronic device is in a first device posture, the object navigation interface is generated based on the object data and displayed on the display screen by:

generating the object navigation interface based on the object data when the parameter is a first parameter representing that the second electronic device is in a first device posture;

acquiring a first position of the second electronic device relative to the first electronic device;

determining a display position of the object navigation interface on the display screen based on the first position; and displaying the object navigation interface at the display position so that the second electronic device blocks part of the object navigation interface.

Alternatively, when the parameter is a second parameter representing that the second electronic device is in a second device posture, the object corresponding to the object data is displayed on the display screen based on the object data by:

detecting and acquiring a predetermined operation when the parameter is the second parameter; and displaying the object corresponding to the object data on the display screen in response to the predetermined operation.

Alternatively, after determining a display form for displaying the object data on the display screen according to a parameter of the object data, the method further comprises:

judging whether the second electronic device is in the second device posture when the object navigation interface is displayed on the display screen; and switching the display screen from displaying the object navigation interface to displaying the object corresponding to the object data when the second electronic device is in the second device posture.

Alternatively, after determining a display form for displaying the object data on the display screen according to a parameter of the object data, the method further comprises:

detecting whether the second electronic device is located within a predetermined spatial region; and displaying the object navigation interface when it is detected that the second electronic device is not located within the predetermined spatial region.

In a second aspect, an embodiment of the present application provides an information processing method applied in a first electronic device which comprises a display screen and a communication interface, the method comprising:

connecting to a second electronic device through the communication interface;

acquiring object data from the second electronic device;

acquiring a current device posture of the second electronic device; and determining a display form for displaying the object data on the display screen according to the current device posture;

wherein when the current device posture is a first device posture, an object navigation interface is generated based on the object data and displayed on the display screen, wherein through the object navigation interface, each object on the second electronic device can be searched and displayed on the display screen; and when the current device posture is a second device posture, M objects are acquired based on the object data and displayed on the display screen, wherein M is a positive integer larger than or equal to 1;

wherein the first device posture is different from the second device posture, and each of the first and second device postures is a device posture of the second electronic device relative to the display screen.

Alternatively, when the current device posture is a first device posture, the object navigation interface is generated based on the object data and displayed on the display screen by:

generating the object navigation interface based on the object data when the current device posture is the first device posture;

acquiring a first position of the second electronic device relative to the first electronic device;

determining a display position of the object navigation interface on the display screen based on the first position; and displaying the object navigation interface at the display position, so that the second electronic device blocks part of the object navigation interface.

Alternatively, when the current device posture is a second device posture, the M objects are acquired based on the object data and displayed on the display screen by:

detecting and acquiring a predetermined operation when the current device posture is the second device posture; and displaying an object corresponding to the object data on the display screen in response to the predetermined operation.

Alternatively, after determining a display form for displaying the object data on the display screen according to the current device posture, the method further comprises:

judging whether the second electronic device is in the second device posture when the object navigation interface is displayed on the display screen; and switching the display screen from displaying the object navigation interface to displaying the object corresponding to the object data when the second electronic device is in the second device posture.

Alternatively, after determining a display form for displaying the object data on the display screen according to the current device posture, the method further comprises:

detecting whether the second electronic device is located within a predetermined spatial region; and displaying the object navigation interface when it is detected that the second electronic device is not located within the predetermined spatial region.

In a third aspect, another embodiment of the present application provides an information processing method applied in a first electronic device which comprises a communication interface, the method comprising:

connecting to a second electronic device through the communication interface; acquiring object data having different parameters from the second electronic device according to a device posture of the second electronic device.

In a fourth aspect, another embodiment of the present application provides an information processing method applied in a first electronic device which comprises a display screen and a communication interface, the method comprising:

connecting to a second electronic device through the communication interface;

displaying different contents on the display screen according to a device posture of the second electronic device.

In a fifth aspect, an embodiment of the present application provides a first electronic device comprising a display screen and a communication interface, wherein the first electronic device further comprising:

a connection unit configured to connect to a second electronic device through the communication interface;

an acquisition unit configured to acquire object data from the second electronic device; and a determination unit configured to determine a display form for displaying the object data on the display screen according to a parameter of the object data;

wherein when the parameter is a first parameter representing that the second electronic device is in a first device posture, an object navigation interface is generated based on the object data and displayed on the display screen, wherein through the object navigation interface, each object on the second electronic device can be searched and displayed on the display screen, and when the parameter is a second parameter representing that the second electronic device is in a second device posture, an object corresponding to the object data is displayed on the display screen based the object data;

wherein the first device posture is different from the second device posture, and each of the first and second device postures is a device posture of the second electronic device relative to the display screen.

Alternatively, the determination unit further comprises:

an acquisition sub-unit configured to generate the object navigation interface based on the object data when the parameter is the first parameter representing that the second electronic device is in a first device posture, and acquire a first position of the second electronic device relative to the first electronic device;

a determination sub-unit configured to determine a display position of the object navigation interface on the display screen based on the first position; and a display sub-unit configured to display the object navigation interface at the display position, so that the second electronic device blocks part of the object navigation interface.

Alternatively, the determination unit further comprises:

a detection sub-unit configured to detect and acquire a predetermined operation when the parameter is the second parameter; and a response sub-unit configured to display the object corresponding to the object data on the display screen in response to the predetermined operation.

Alternatively, the first electronic device further comprises:

a judging unit configured to judge whether the second electronic device is in the second device posture when the object navigation interface is displayed by the first electronic device; and a switching unit configured to switch the display screen from displaying the object navigation interface to displaying the object corresponding to the object data when the second electronic device is in the second device posture.

Alternatively, the first electronic device further comprises:

a detection unit configured to detect whether the second electronic device is located within a predetermined spatial region; and a display unit configured to display the object navigation interface when it is detected that the second electronic device is not located within the predetermined spatial region.

In a sixth aspect, another embodiment of the present application provides a first electronic device comprising a display screen and a communication interface, wherein the first electronic device further comprising:

a connection unit configured to connect to a second electronic device through the communication interface;

a first acquisition unit configured to acquire object data from the second electronic device;

a second acquisition unit configured to acquire a current device posture of the second electronic device; and a determination unit configured to determine a display form for displaying the object data on the display screen according to the current device posture;

wherein when the current device posture is a first device posture, an object navigation interface is generated based on the object data and displayed on the display screen, wherein through the object navigation interface, each object on the second electronic device can be searched and displayed on the display screen; and when the current device posture is a second device posture, M objects are acquired based on the object data and displayed on the display screen, wherein M is a positive integer larger than or equal to 1;

wherein the first device posture is different from the second device posture, and each of the first and second device postures is a device posture of the second electronic device relative to the display screen.

Alternatively, the determination unit further comprises:

an acquisition sub-unit configured to generate the object navigation interface based on the object data when the current device posture is the first device posture, and acquire a first position of the second electronic device relative to the first electronic device;

a determination sub-unit configured to determine a display position of the object navigation interface on the display screen based on the first position; and a display sub-unit configured to display the object navigation interface at the display position, so that the second electronic device blocks part of the object navigation interface.

Alternatively, the determination unit further comprises:

a detection sub-unit configured to detect and acquire a predetermined operation when the current device posture is the second device posture; and a response sub-unit configured to display an object corresponding to the object data on the display screen in response to the predetermined operation.

Alternatively, the first electronic device further comprises:

a judging unit configured to judge whether the second electronic device is in the second device posture when the object navigation interface is displayed by the first electronic device; and a switching unit configured to switch the display screen from displaying the object navigation interface to displaying the object corresponding to the object data when the second electronic device is in the second device posture.

Alternatively, the first electronic device further comprises:

a detection unit configured to detect whether the second electronic device is located within a predetermined spatial region; and a display unit configured to display the object navigation interface when it is detected that the second electronic device is not located within the predetermined spatial region.

In a seventh aspect, another embodiment of the present application provides a first electronic device comprising a communication interface, the first electronic device further comprising:

a connection unit configured to connect to a second electronic device through the communication interface;

an acquisition unit configured to acquire object data having different parameters from the second electronic device according to a device posture of the second electronic device.

In an eighth aspect, another embodiment of the present application provides an first electronic device comprising a display screen and a communication interface, the first electronic device further comprising:

a connection unit configured to connect to a second electronic device through the communication interface;

a display unit configured to display different contents on the display screen according to a device posture of the second electronic device.

One or more of the solutions according to the embodiments of the present application have at least the following effects or advantages.

1. The first electronic device is connected to the second electronic device using a communication interface, object data is acquired from the second electronic device, and according to a parameter of the object data, each object on the second electronic device is acquired and displayed through an object navigation interface, or an object corresponding to the object data is acquired and displayed directly. This solves the problem in the conventional technology that there is only a single approach for data transfer, and provides a plurality of approaches for data transfer.

2. The first electronic device is connected to the second electronic device using a communication interface, object data is acquired from the second electronic device, and according to a current device posture of the second electronic device, each object on the second electronic device is acquired and displayed through an object navigation interface, or an object corresponding to the object data is acquired and displayed directly. This solves the problem in the conventional technology that there is only a single approach for data transfer, and provides a plurality of approaches for data transfer.

3. The first electronic device is connected to the second electronic device using a communication interface, and object data including different parameters is acquired from the second electronic device based on a device posture of the second electronic device. Therefore, the first electronic device can be controlled to acquire different transmitted data according to the device posture of the second electronic device.

4. The first electronic device is connected to the second electronic device using a communication interface, and different contents are displayed on the display screen of the first electronic device based on a device posture of the second electronic device. Therefore, the first electronic device can be controlled to display different display contents according to the device posture of the second electronic device.

DETAILED DESCRIPTION OF THE EMBODIMENTS

Figure 1:
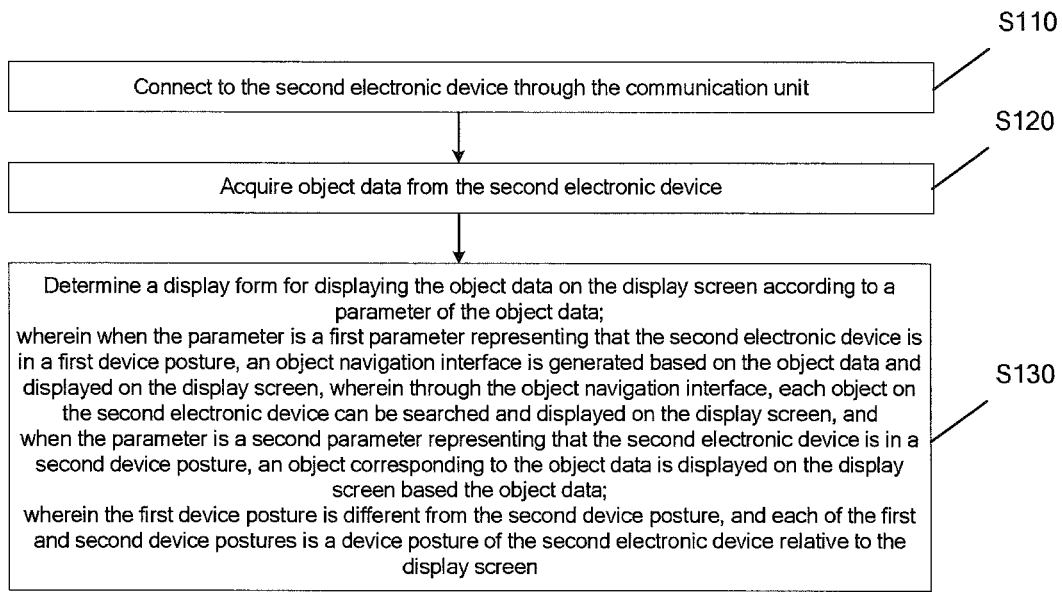
FIG. 1 is a flowchart illustrating an information processing method according to a first embodiment of the present application.

The embodiments of the present application provide an information processing method and a first electronic device. The first electronic device is connected to the second electronic device using a communication interface, object data is acquired from the second electronic device, and according to a parameter of the object data, each object on the second electronic device is acquired and displayed through an object navigation interface, or an object corresponding to the object data is acquired and displayed directly. Therefore, the problem in the conventional technology that there is only a single approach for data transfer is effectively solved, and a plurality of data transfer approaches are provided.

In order to solve the above problem that there is only a single approach for data transfer, the general concept of the technical solutions according to the embodiments of the present application is as follows.

Firstly, a first electronic device is connected to a second electronic device through a communication interface. Then, object data is acquired from the second electronic device. Finally, a display form for displaying the object data on a display screen of the first electronic device is determined according to a parameter of the object data. Specifically, when the parameter of the object data is a first parameter representing that the second electronic device is in a first device posture, an object navigation interface is generated based on the object data. Through the object navigation interface, each object on the second electronic device can be searched and displayed on the first electronic device. When the parameter of the object data is a second parameter representing that the second electronic device is in a second device posture, an object corresponding to the object data is displayed on the display screen of the first electronic device based on the object data.

That is, according to the parameter of the object data, each object on the second electronic device may be acquired and displayed through the object navigation interface, or the object corresponding to the object data may be acquired and displayed directly. Therefore, the technical problem in the conventional technology that there is only a single approach for data transfer is effectively solved, and a plurality of approaches for data transfer are provided.

In order to better understand the above technical solutions, the above technical solutions will be described in detail below in conjunction with the accompanying drawings of the description and specific embodiments.

First Embodiment

The embodiment of the present application provides an information processing method, applied in a first electronic device which comprises a display screen and a communication interface. Specifically, the first electronic device may be a tablet computer, a large-screen display device etc. The display screen may be a touch-sensitive display screen, a non-touch-sensitive display screen etc. The communication interface may be an physical interface such as a USB interface, or may also be a communication interface such as Bluetooth, a wireless connection interface etc. The first electronic device, the display screen included in the first electronic device and the communication interface included in the first electronic device are described here only by way of example. In practice, electronic devices, display screens and communication interfaces with the same functions all fall within the protection scope of the present application. The embodiment will be described below by taking a tablet computer including a touch-sensitive display screen and a wireless connection interface as an example of the first electronic device.

As shown in FIG. 1, the information processing method of the present application specifically includes the following steps.

Step S110: connecting the first electronic device to the second electronic device through the communication interface;

Step S120: acquiring object data from the second electronic device; and

Step S130: determining a display form for displaying the object data on the display screen according to a parameter of the object data;

wherein when the parameter is a first parameter representing that the second electronic device is in a first device posture, an object navigation interface is generated based on the object data and is displayed on the display screen, through the object navigation interface, each object on the second electronic device can be searched and displayed on the display screen; and when the parameter is a second parameter representing that the second electronic device is in a second device posture, an object corresponding to the object data is displayed on the display screen based on the object data; and wherein the first device posture is different from the second device posture, and each of the first and second device postures is a device posture of the second electronic device relative to the display screen.

Firstly, a specific implementation of step S110 will be described in detail below.

The information processing method of the present application is applied in data transfer between electronic devices. In order to complete the data transfer, the first electronic device is firstly connected to the second electronic device. The second electronic device may be a smart phone, a tablet computer, a notebook etc., which is not limited in the present application. The embodiment will be described by taking a smart phone as the second electronic device.

As an example, a specific implementation of step S110 is that the smart phone is connected to the tablet computer through a USB interface, Bluetooth or a wireless connection interface.

After step S110 is completed, step S120 of acquiring object data from the second electronic device will be performed in the information processing method of the present application.

The implementation of step S120 will be further described in detail below by taking a tablet computer including a touch display screen and a wireless connection interface as the first electronic device and taking a smart phone as the second electronic device.

After the first electronic device is connected to the second electronic device, the first electronic device may acquire object data to be transmitted from the second electronic device through the communication interface. The object data may be a folder directory in the second electronic device. In this case, a particular file such as a document, a picture, an audio, a video etc. may be found by clicking on the folder directory on a level basis, or the object data itself may be a particular file, such as a document, a picture, an audio, a video etc.

That is, the object data acquired by the tablet computer from the smart phone may be a folder directory which is formed by files stored in the smart phone, or may also be a particular file itself stored in the smart phone.

After step S120 is completed, step S130 of determining a display form for displaying the object data on the display screen according to a parameter of the object data will be performed in the information processing method of the present application.

When the parameter is a first parameter representing that the second electronic device is in a first device posture, an object navigation interface is generated based on the object data and displayed on the display screen, so that through the object navigation interface, each object on the second electronic device can be searched and displayed on the display screen at the first electronic device.

When the parameter is a second parameter representing that the second electronic device is in a second device posture, an object corresponding to the object data is displayed on the display screen based on the object data.

The first device posture is different from the second device posture, and each of the first device posture and the second device posture is a device posture relative to the display screen.

The implementation of step S130 will be described in detail below by taking a tablet computer including a touch-sensitive display screen and a wireless connection interface as the first electronic device and taking a smart phone as the second electronic device.

After step S120 is completed, the first electronic device has acquired the object data from the second electronic device. The object data may be a folder directory or may also be a file itself. That is, the object data has different parameters.

When the object data is a folder directory, the object data includes a first parameter indicating that the second electronic device is in a first device posture, i.e., the second electronic device is located at a first position relative to the display screen of the first electronic device. For example, the second electronic device is parallel to or approximately parallel to the display screen of the first electronic device. At this time, the first electronic device maps, through a file system, the object data to types and indices of files stored in the second electronic device, and then generates the object navigation interface and displays it on the display screen. Through the object navigation interface, each object on the second electronic device can be searched and displayed on the display screen of the first electronic device at the first electronic device. That is, the object navigation interface displays the file types of all the files stored in the second electronic device, and all the file types stored in the second electronic device may be searched and displayed through the object navigation interface.

When the object data is a file itself, the object data includes a second parameter indicating that the second electronic device is in a second device posture, i.e., the second electronic device is located at a second position relative to the display screen of the first electronic device. For example, the second electronic device is perpendicular to or approximately perpendicular to the display screen of the first electronic device. At this time, the first electronic device directly displays the file itself.

As an example, the object data acquired by the tablet computer from the smart phone may be a folder directory, or a file itself. When the object data is a folder directory, the object data includes a first parameter indicating that the smart phone is positioned parallel to or approximately parallel to the display screen of the tablet computer. At this time, the file system of the tablet computer will acquire types of all files stored in the smart phone, such as documents, pictures, audios, videos, as well as an indexing of all the files, such as how to find each document, picture, audio or video by clicking on a level basis. Then, the tablet computer generates an object navigation interface from all the file types and displays the object navigation interface. A user may clearly see the file types of all the files stored in the smart phone through the object navigation interface, and may find each file stored in the smart phone by clicking on the object navigation interface.

Figure 2:
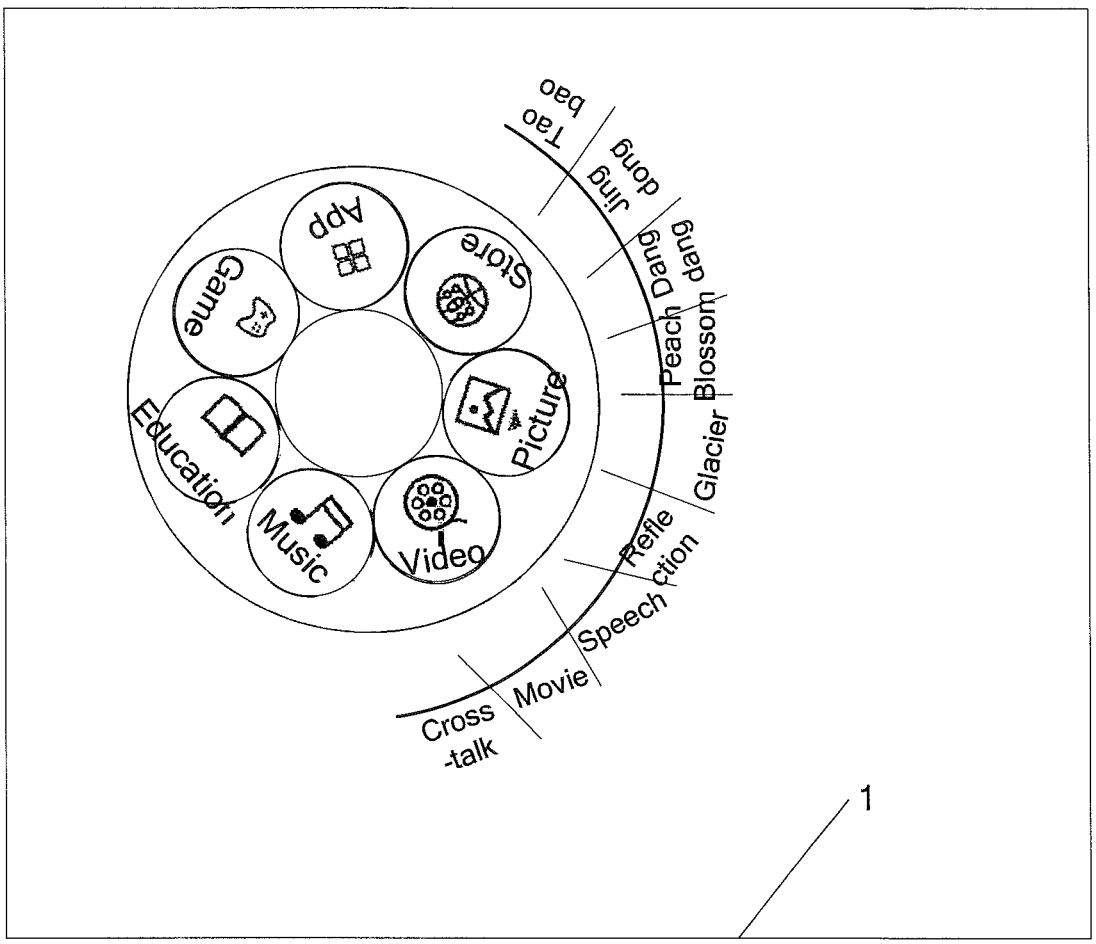
FIG. 2 is a schematic diagram of an object navigation interface according to the first embodiment of the present application.

The object navigation interface 1 as shown in FIG. 2 displays file types of all files stored in the smart phone including applications, games, educations, music, videos, pictures and stores. A user may find a particular file stored in the smart phone, such as Taobao, Jingdong, Dangdang etc., by clicking on the stores in the object navigation interface.

When the object data is a file, the object data includes a second parameter indicating that the smart phone is positioned perpendicular to or approximately perpendicular to the display screen of the tablet computer. At this time, the tablet computer will directly acquire and display the file itself, such as a picture, a document etc.

In a specific implementation, in step S130, when the parameter is a first parameter representing that the second electronic device is in a first device posture, an object navigation interface is generated based on the object data and displayed on the display screen by:

when the parameter is a first parameter representing that the second electronic device is in a first device posture, generating the object navigation interface based on the object data, and acquiring a first position of the second electronic device relative to the first electronic device;

determining a display position of the object navigation interface on the display screen based on the first position; and displaying the object navigation interface at the display position, so that the second electronic device blocks part of the object navigation interface.

The above implementation will be described in detail below by taking a tablet computer including a touch-sensitive display screen and a wireless connection interface as the first electronic device and taking a smart phone as the second electronic device.

When the object data is a folder directory, the object data includes a first parameter indicating that the second electronic device is in a first device posture. At this time, the object navigation interface is displayed on the first electronic device. The display process is specifically performed as follows.

Firstly, the first electronic device acquires a first position of the second electronic device relative to the first electronic device. For example, the second electronic device transmits information about the first position to the first electronic device, or the first electronic device determines the first position through a camera or a scanning line.

Next, the first electronic device determines a display position of the object navigation interface on the display screen of the first electronic device based on the first position. For example, if the first position indicates that the second electronic device is located at the upper right side of the first electronic device, the display position of the object navigation interface on the display screen of the first electronic device is at the upper right corner.

Finally, the object navigation interface is displayed at the display position. For example, if the second electronic device is located at the upper right side of the first electronic device, the object navigation interface is displayed at the upper right corner of the display screen of the first electronic device. Part of the object navigation interface may be blocked by the second electronic device, because the second electronic device is in a first device posture, i.e., the second electronic device is parallel to or approximately parallel to the display screen of the first electronic device, and the second electronic device is located at the upper right side of the first electronic device.

As an example, when the object data acquired by the tablet computer from the smart phone is a folder directory, the object data includes a first parameter indicating that the smart phone is parallel to or approximately parallel to the display screen of the tablet computer. At this time, the tablet computer acquires the position of the smart phone relative to the tablet computer. The acquisition may be specifically performed in a manner that the smart phone transmits position information to the tablet computer, a camera of the tablet computer determines the position information, or the tablet computer scans to acquire the position information.

If the acquired position information is that the smart phone is located at the upper right side of the tablet computer, the tablet computer will determine that the display position of the object navigation interface on the display screen is at the upper right corner. Finally, the object navigation interface is displayed at the upper right corner of the display screen of the tablet computer. Part of the object navigation interface may be blocked by the smart phone since the smart phone is parallel to or approximately parallel to the display screen of the tablet computer and the smart phone is located at the upper right side of the tablet computer.

Figure 3:
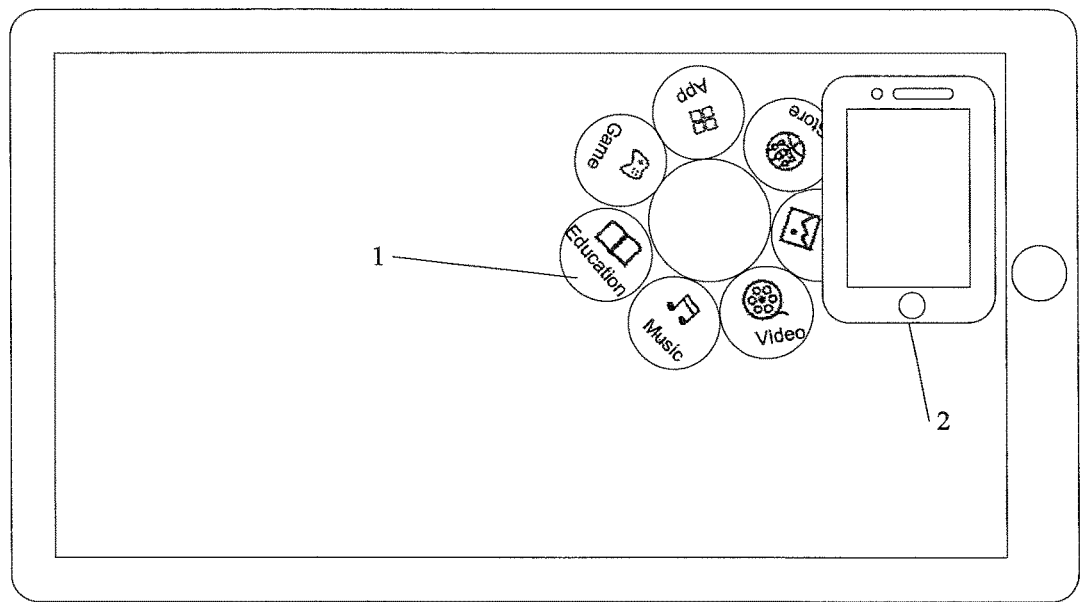
FIG. 3 is a schematic diagram of implementation of step S130 according to the first embodiment of the present application or step S240 according to a second embodiment of the present application.

As shown in FIG. 3, the smart phone 2 is located at the upper right side of the tablet computer 3, and then the object navigation interface 1 is displayed at the upper right corner of the display screen of the tablet computer 3, and part of the object navigation interface 1 is blocked by the smart phone 2.

In a specific implementation, in step S130, when the parameter is a second parameter representing that the second electronic device is in a second device posture, an object corresponding to the object data is displayed on the display screen based on the object data by:

detecting and acquiring a predetermined operation when the parameter is the second parameter; and displaying the object corresponding to the object data on the display screen in response to the predetermined operation.

The above implementation will be described in detail below by taking a tablet computer including a touch-sensitive display screen and a wireless connection interface as the first electronic device and taking a smart phone as the second electronic device.

When the object data is a file, the object data includes a second parameter indicating that the second electronic device is in a second device posture. At this time, an object corresponding to the object data is displayed on the first electronic device. The display process is specifically performed as follows.

Firstly, the first electronic device detects and acquires a predetermined operation of the second electronic device, for example, shaking the second electronic device.

Subsequently, the object corresponding to the object data, i.e., the file itself, is displayed in response to the predetermined operation. The object corresponding to the data object may be displayed at a predetermined position of the display screen of the first electronic device. For example, the object corresponding to the data object is displayed as appearing from the center of the display screen, or is displayed as extending gradually from one side of the display screen to the other side.

As an example, when the object data acquired by the tablet computer from the smart phone is a file, the object data includes a second parameter indicating that the smart phone is perpendicular to or approximately perpendicular to the display screen of the tablet computer. At this time, the tablet computer detects whether the smart phone acquires a predetermined operation, such as shaking the smart phone. When the tablet computer detects that the smart phone acquires the predetermined operation, such as the smart phone being shaken, the tablet computer displays the file itself. The file may be displayed as appearing from the center of the display screen of the tablet computer, or may be displayed as extending gradually from one side of the display screen of the tablet computer to the other side of the display screen.

Figure 4:
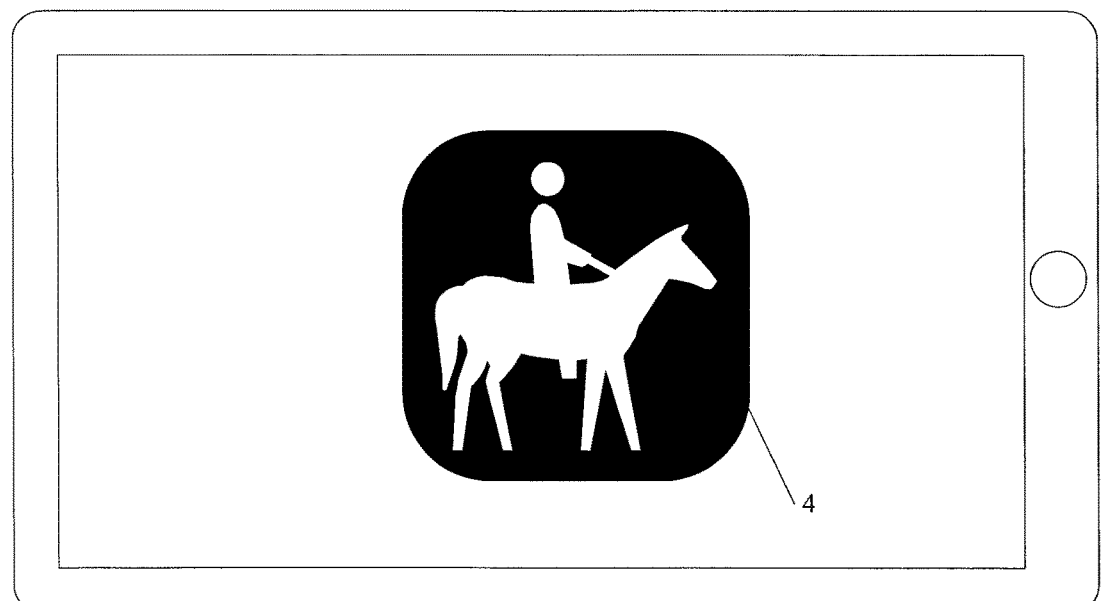
FIG. 4 is a schematic diagram of another implementation of step S130 according to the first embodiment of the present application or step S240 according to the second embodiment of the present application.

As shown in FIG. 4, the smart phone is perpendicular to or approximately perpendicular to the display screen of the tablet computer. At this time, if the tablet computer detects that the smart phone is shaken, a file, such as a picture 4, will be displayed on a display screen of the tablet computer 3.

When the tablet computer detects that the smart phone is shaken continuously, picture files in the smart phone will be randomly displayed as appearing from the center of the display screen of the tablet computer. Files will be displayed as stacks until the shaking is stopped. A first stack of files will appear upon the first shaking, and a second stack of files will appear upon the second shaking, and so on. The rhythm of shaking will influence how the files appear. That is, if the shaking speed is fast, a large number of files will appear in a short time, and if the shaking speed is slow, a small number of files will appear in a long time. After all the files in the smart phone are moved to the tablet computer, if the smart phone continues to be shaken, a prompt that all the files have been transmitted will be issued in the form of voice or vibration.

After step S130 is completed, the information processing method according to the embodiments of the present application further includes a first step and a second step as follows.

First step: determining whether the second electronic device is in the second device posture when the object navigation interface is displayed on the display screen; and switching the display screen from displaying the object navigation interface to displaying an object corresponding to the object data when the second electronic device is in the second device posture.

Second Step:

detecting whether the second electronic device is in a predetermined spatial region; and displaying the object navigation interface when it is detected that the second electronic device is not in the predetermined spatial region.

An implementation of the first step will be described in detail below by taking a tablet computer including a touch-sensitive display screen and a wireless connection interface as the first electronic device and taking a smart phone as the second electronic device.

While the display screen of the first electronic device displays the object navigation interface, it is determined whether the device posture of the second electronic device is switched from the first device posture to the second device posture.

When a determination result indicates that the device posture of the second electronic device has been shifted to the second device posture, the display screen of the first electronic device is switched from displaying the object navigation interface to displaying the object corresponding to the object data.

As an example, when the display screen of the tablet computer displays the object navigation interface, the parameter of the object data is a first parameter, and the smart phone is parallel to or approximately parallel to the display screen of the tablet computer, all the files in the smart phone may be searched and displayed through the object navigation interface. At this time, if the smart phone is shifted to be perpendicular to or approximately perpendicular to the display screen of the tablet computer, the display screen of the tablet computer will be switched to displaying a particular file.

Figure 5:
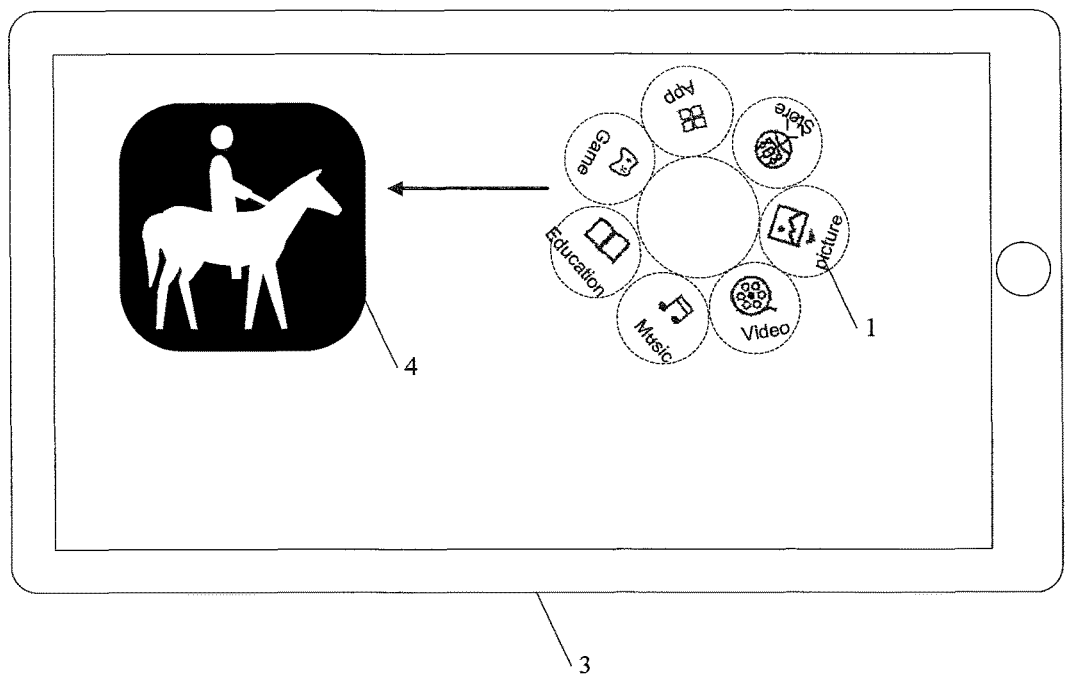
FIG. 5 is a schematic diagram of implementation of a first step according to the first embodiment of the present application.

As shown in FIG. 5, while a display screen of a tablet computer 3 displays an object navigation interface 1, if the smart phone is shifted to be perpendicular to or approximately perpendicular to the display screen of the tablet computer 3, the display screen of the tablet computer 3 will be switched to displaying a particular file, such as a picture 4.

There are at least two specific schemes for the above switching operation.

The first scheme is that if the smart phone is shifted to be perpendicular to the display screen of the tablet computer and the smart phone is shaken, the object navigation interface on the display screen will vibrate along with the smart phone, and a particular file will fly out of the object navigation interface and be displayed near the object navigation interface.

The second scheme is that the if the smart phone is shifted to be perpendicular to the display screen of the tablet computer and the smart phone is shaken, the particular file will be displayed as appearing from a predetermined position of the display screen, irrespective of the position of the object navigation interface. For example, the particular file may be displayed as appearing from the center of the display screen. At this time, for easier operation, the object navigation interface may continue to be displayed on the display screen. On the other side, for confidentiality and security, the object navigation interface may not be displayed on the display screen.

An implementation of the second step will be described in detail below by taking a tablet computer including a touch-sensitive display screen and a wireless connection interface as the first electronic device and taking a smart phone as the second electronic device.

Firstly, the first electronic device detects whether the second electronic device is located within a predetermined spatial region. For example, the first electronic device detects whether the second electronic device is located within a spherical region centered on the first electronic device with a radius of a predetermined length.

Next, when the first electronic device detects that the second electronic device is not located within the predetermined spatial region, the object navigation interface is displayed. That is, the object navigation interface will be displayed as long as the second electronic device is not disconnected from the first electronic device.

As an example, the tablet computer detects whether the smart phone is located within a predetermined spatial region. For example, the tablet computer detects whether the smart phone is located within a spherical region centered on the tablet computer with a radius of 1 meter. For example, if a perpendicular distance between the smart phone and the tablet computer is 0.5 meter, the tablet computer detects that the smart phone is located within a predetermined spatial region, irrespective of the device posture of the smart phone relative to the display screen of the tablet computer. The smart phone may be laid flat on the tablet computer, or may be picked up by a user to be in an upright state and be shaken above the tablet computer.

When it is detected that the smart phone is not located within the predetermined spatial region, the display screen of the smart phone displays the object navigation interface. That is, the object navigation interface will be displayed as long as the smart phone is not disconnected from the tablet computer. If the display screen has displayed the object navigation interface before the smart phone is moved out of the predetermined spatial region, the object navigation interface will continue to be displayed after the smart phone is moved out of the predetermined spatial region. If the display screen displays a particular file before the smart phone is moved out of the predetermined spatial region, the display screen will be switched from displaying the particular file to displaying the object navigation interface after the smart phone is moved out of the predetermined spatial region.

Based on the single general inventive concept, the embodiments of the present invention further provide an electronic device. Since the principle of solving the problems of the electronic device is similar to that of the information processing method, the implementation of the electronic device can be learned with reference to the implementation of the information processing method, and the repeated parts will be omitted.

Figure 6:
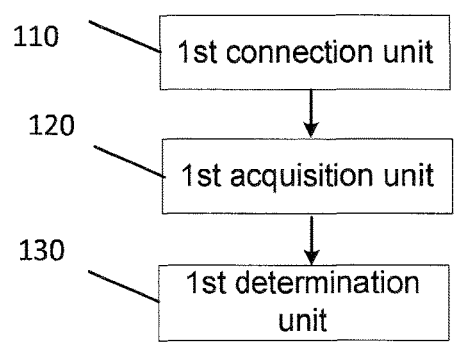
FIG. 6 is a block diagram of a first electronic device according to the first embodiment of the present application.

As shown in FIG. 6, a first electronic device including a display screen and a communication interface is provided, and the first electronic device further includes:

a first connection unit 110 configured to connect to a second electronic device through the communication interface;

a first acquisition unit 120 configured to acquire object data from the second electronic device; and a first determination unit 130 configured to determine a display form for displaying the object data on the display screen according to a parameter of the object data;

wherein when the parameter is a first parameter representing that the second electronic device is in a first device posture, an object navigation interface is generated based on the object data and displayed on the display screen, wherein through the object navigation interface, each object on the second electronic device can be searched and displayed on the display screen, and when the parameter is a second parameter representing that the second electronic device is in a second device posture, an object corresponding to the object data is displayed on the display screen based the object data;

wherein the first device posture is different from the second device posture, and each of the first and second device postures is a device posture of the second electronic device relative to the display screen.

Specifically, the first determination unit 130 further includes:

a first acquisition sub-unit configured to generate the object navigation interface based on the object data when the parameter is a first parameter representing that the second electronic device is in a first device posture, and acquire a first position of the second electronic device relative to the first electronic device;

a first determination sub-unit configured to determine a display position of the object navigation interface on the display screen based on the first position; and a first display sub-unit configured to display the object navigation interface at the display position, so that the second electronic device blocks part of the object navigation interface.

Specifically, the first determination unit 130 further includes:

a first detection sub-unit configured to detect and acquire a predetermined operation when the parameter is the second parameter; and a first response sub-unit configured to display the object corresponding to the object data on the display screen in response to the predetermined operation.

Alternatively, the first electronic device further includes:

a first determination unit configured to determine whether the second electronic device is in the second device posture when the object navigation interface is displayed on the display screen; and a first switching unit configured to switch the display screen from displaying the object navigation interface to displaying the object corresponding to the object data when the second electronic device is in the second device posture.

Alternatively, the first electronic device further includes:

a first detection unit configured to detect whether the second electronic device is located within a predetermined spatial region; and a first display unit configured to display the object navigation interface when it is detected that the second electronic device is not located within the predetermined spatial region.

Second Embodiment

The embodiment of the present application provides an information processing method in a first electronic device including a display screen and a communication interface. Specifically, the first electronic device may be a tablet computer, a large-screen display device etc. The display screen may be a touch-sensitive display screen, a non-touch-sensitive display screen etc. The communication interface may be a physical interface such as a USB interface, or may also be a communication interface such as Bluetooth, a wireless connection interface etc. The first electronic device, and the display screen and the communication interface included in the first electronic device are described here only by way of example. In practice, electronic devices, display screens and communication interfaces with the same functions all fall within the protection scope of the present application. The embodiments will be described by taking a tablet computer including a touch-sensitive display screen and a wireless connection interface as an example of the first electronic device.

Figure 7:
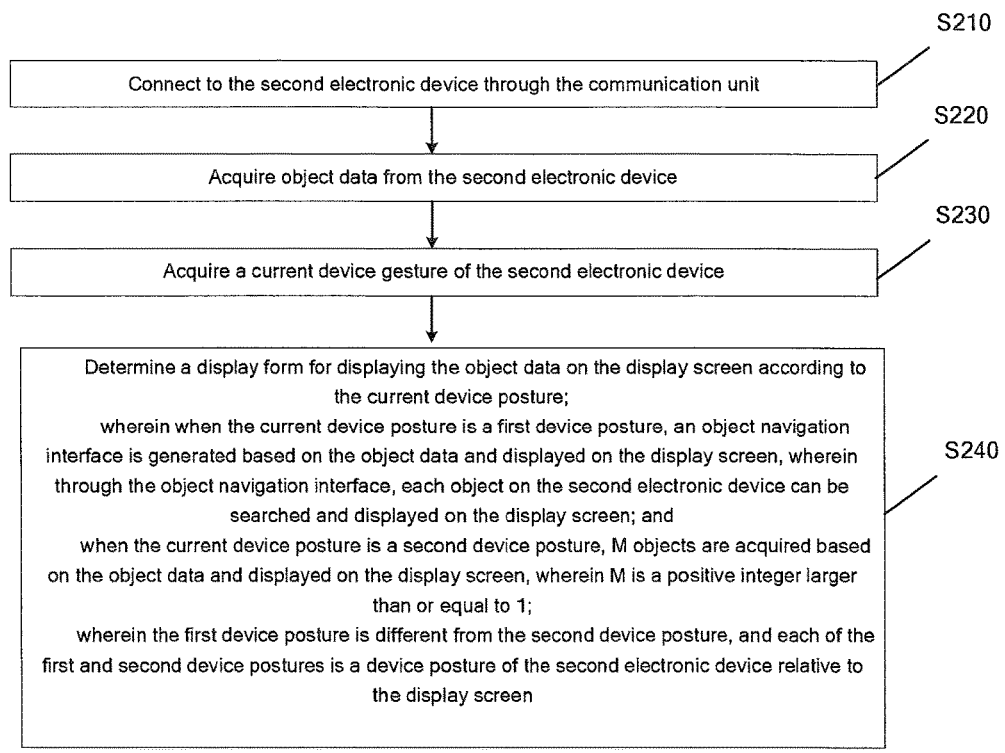
FIG. 7 is a flowchart of an information processing method according to the second embodiment of the present application.

As shown in FIG. 7, the information processing method of the present application specifically includes the following steps.

Step S210: connecting the first electronic device to the second electronic device through the communication interface;

Step S220: acquiring object data from the second electronic device;

Step S230: acquiring a current device posture of the second electronic device; and Step S240: determining a display form for displaying the object data on the display screen according to the current device posture;

wherein an object navigation interface is generated based on the object data and displayed on the display screen when the current device posture is a first device posture, through the object navigation interface, each object on the second electronic device can be searched and displayed on the display screen; and M objects are acquired based on the object data and displayed on the display screen when the current device posture is a second device posture, wherein M is a positive integer which is larger than or equal to 1;

wherein the first device posture is different from the second device posture, and each of the first device posture and the second device posture is a device posture of the second electronic device relative to the display screen.

Below, a specific implementation of step S210 will be described in detail.

The information processing method of the present application is applied for data transfer between electronic devices. In order to complete the data transfer, the first electronic device is firstly connected to the second electronic device. The second electronic device may be a smart phone, a tablet computer, a notebook etc., which is not limited in the present application. The embodiments will be described by taking a smart phone as the second electronic device.

As an example, a specific implementation of step S210 is that the smart phone is connected to the tablet computer through a USB interface, Bluetooth or a wireless connection interface.

After step S210 is completed, step S120 of acquiring object data from the second electronic device will be performed in the information processing method of the present application.

The implementation of step S120 will be described in detail below by taking a tablet computer including a touch-sensitive display screen and a wireless connection interface as the first electronic device and taking a smart phone as the second electronic device.

After the first electronic device is connected to the second electronic device, the first electronic device may acquire object data to be transmitted from the second electronic device through the communication interface. The object data may be a folder directory in the second electronic device. In this case, a particular file such as a document, a picture, an audio, a video etc. can be found by clicking on the folder directory on a level basis, or the object data may also be a particular file itself, such as a document, a picture, an audio, a video etc.

That is, the object data acquired by the tablet computer from the smart phone may be a folder directory which is formed by files stored in the smart phone, or may also be a particular file stored in the smart phone.

After step S220 is completed, step S230 of acquiring a current device posture of the second electronic device will be performed in the information processing method of the present application.

The implementation of step 230 will be described in detail below by taking a tablet computer including a touch-sensitive display screen and a wireless connection interface as the first electronic device and taking a smart phone as the second electronic device.

The first electronic device acquires a current device posture of the second electronic device. A specific acquisition scheme may be that the second electronic device transmits its own current device posture information to the first electronic device, or the first electronic device determines the device posture of the second electronic device through a camera or a scanning line.

Figure 8A:
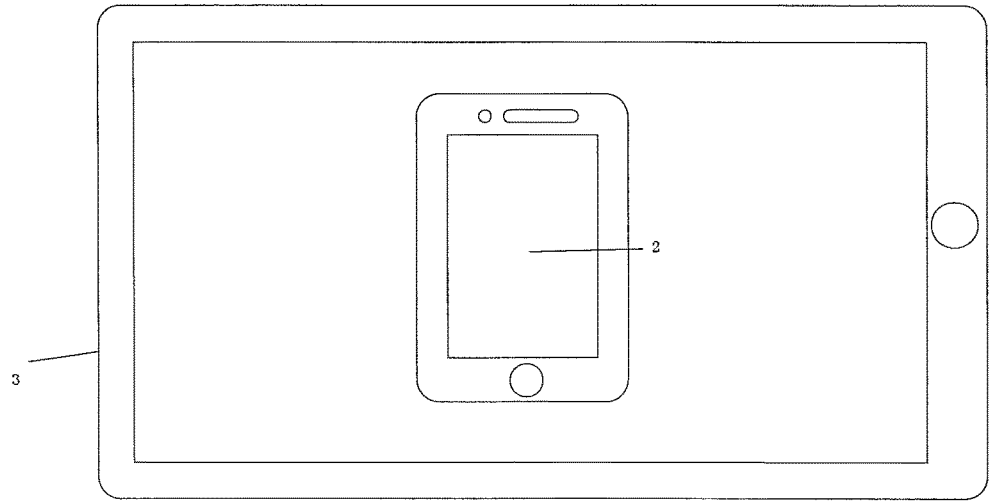
FIGS. 8A-8B are schematic diagrams of a current device posture of a second electronic device in an information processing method according to the second embodiment of the present application.
Figure 8B:
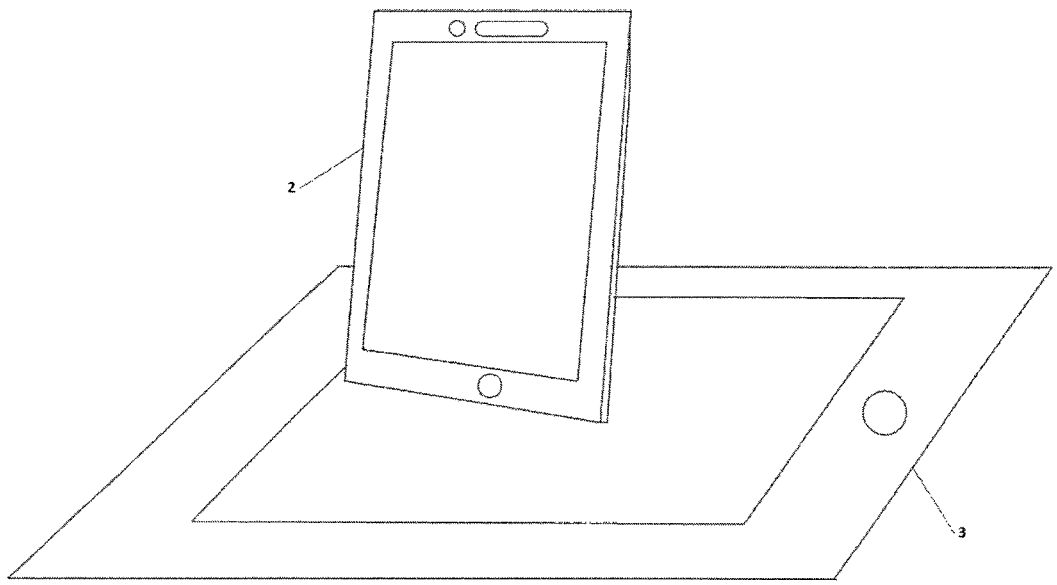

The current device posture of the second electronic device may be a first device posture, i.e., the second electronic device is parallel to or approximately parallel to the display screen of the first electronic device. As shown in FIG. 8A, the smart phone 2 is parallel to or approximately parallel to the display screen of the tablet computer 3. The current device posture of the second electronic device may also be a second device posture, i.e., the second electronic device is perpendicular to or approximately perpendicular to the display screen of the first electronic device. As shown in FIG. 8B, the smart phone 2 is perpendicular to or approximately perpendicular to the display screen of the tablet computer 3.

After step S230 is completed, step S240 of determining a display form for displaying the object data on the display screen according to the current device posture will be performed in the information processing method of the present application.

wherein an object navigation interface is generated based on the object data and displayed on the display screen when the current device posture is a first device posture, through the object navigation interface, each object on the second electronic device can be searched and displayed on the display screen; and M objects are acquired based on the object data and displayed on the display screen when the current device posture is a second device posture, wherein M is a positive integer which is larger than or equal to 1;

wherein the first device posture is different from the second device posture, and each of the first device posture and the second device posture is a device posture of the second electronic device relative to the display screen.

The implementation of step S240 will be described in detail below by taking a tablet computer including a touch-sensitive display screen and a wireless connection interface as the first electronic device and taking a smart phone as the second electronic device.

After step S230 is completed, the first electronic device has acquired a current device posture of the second electronic device from the second electronic device.

When the second electronic device is in a first device posture, i.e., the second electronic device is located at a first position relative to the display screen of the first electronic device, for example, the second electronic device is parallel to or approximately parallel to the display screen of the first electronic device, the first electronic device maps the object data to types and indices of all the files stored in the second electronic device through a file system, and then generates the object navigation interface and displays it on the display screen, so that each object on the second electronic device can be searched and displayed on the display screen of the first electronic device through the object navigation interface at the first electronic device. That is, the object navigation interface displays the types of all the files stored in the second electronic device, and all the file types stored in the second electronic device may be searched and displayed through the object navigation interface.

The object navigation interface 1 as shown in FIG. 2 displays file types of all the files stored in the smart phone, including applications, games, educations, music, videos, pictures and stores. A user may find a particular file stored in the smart phone such as Taobao, Jingdong, Dangdang etc. by clicking on the stores in the object navigation interface.

When the second electronic device is in a second device posture, i.e., the second electronic device is located at a second position relative to the display screen of the first electronic device, for example, the second electronic device is perpendicular to or approximately perpendicular to the display screen of the first electronic device, the first electronic device directly displays a particular file itself.

As an example, the object data acquired by the tablet computer from the smart phone may be a folder directory, or may also be a particular file itself. When the smart phone is positioned parallel to or approximately parallel to the display screen of the tablet computer, a file system of the tablet computer will acquire file types of all the files stored in the smart phone, such as documents, pictures, audios, videos, as well as indexing of each file, such as how to find each document, picture, audio or video by clicking on a level basis. Then, the tablet computer generates one object navigation interface from all the file types and displays the object navigation interface. A user may clearly see the file types of all the files stored in the smart phone through the object navigation interface, and may find each file stored in the smart phone by clicking on the object navigation interface.

When the smart phone is positioned perpendicular to or approximately perpendicular to the display screen of the tablet computer, the tablet computer directly acquires and displays the particular file itself, such as a picture, a document etc.

In a specific implementation, in step S240, when the current device posture is a first device posture, an object navigation interface is generated based on the object data and displayed one the display screen by:

generating the object navigation interface based on the object data when the current device posture is a first device posture, and acquiring a first position of the second electronic device relative to the first electronic device;

determining a display position of the object navigation interface on the display screen based on the first position; and displaying the object navigation interface at the display position, so that the second electronic device blocks part of the object navigation interface.

The above implementations will be described in detail below by taking a tablet computer including a touch-sensitive display screen and a wireless connection interface as the first electronic device and taking a smart phone as the second electronic device.

When the current device posture is a first device posture, the object navigation interface is displayed on the first electronic device. The display process may be specifically performed as follows.

Firstly, the first electronic device acquires a first position of the second electronic device relative to the first electronic device. For example, the second electronic device transmits information about first position to the first electronic device, or the first electronic device determines the first position through a camera or a scanning line.

Next, the first electronic device determines a display position of the object navigation interface on the display screen of the first electronic device based on the first position. For example, if the first position is that the second electronic device is located at the upper right side of the first electronic device, the display position of the object navigation interface on the display screen of the first electronic device will be at the upper right corner.

Finally, the object navigation interface is displayed at the display position. For example, if the second electronic device is located at the upper right side of the first electronic device, the object navigation interface will be displayed at the upper right corner of the display screen of the first electronic device. A part of the object navigation interface will be blocked by the second electronic device because the second electronic device is in a first device posture, i.e., the second electronic device is parallel to or approximately parallel to the display screen of the first electronic device, and the second electronic device is located at the upper right side of the first electronic device.

As shown in FIG. 3, the smart phone 2 is located at the upper right side of the tablet computer 3, and then the object navigation interface 1 is displayed at the upper right corner of the display screen of the tablet computer 3, and a part of the object navigation interface 1 is blocked by the smart phone 2.

As an example, when the current device posture is a first device posture, the smart phone is parallel to or approximately parallel to the display screen of the tablet computer. At this time, the tablet computer acquires the position of the smart phone relative to the tablet computer. A specific acquisition scheme may be that the smart phone transmits position information to the tablet computer, a camera of the tablet computer determines the position information, or the tablet computer scans to acquire the position information.

If the acquired position information is that the smart phone is located at the upper right side of the tablet computer, the tablet computer will determine that the display position of the object navigation interface on the display screen is at the upper right corner. Finally, the object navigation interface is displayed at the upper right corner of the display screen of the tablet computer. A part of the object navigation interface will be blocked by the smart phone since the smart phone is parallel to or approximately parallel to the display screen of the tablet computer and the smart phone is located at the upper right side of the tablet computer.

In a specific implementation, in step S240, when the current device posture is a second device posture, an object corresponding to the object data is displayed on the display screen based on the object data by:

detecting and acquiring a predetermined operation when the current device posture is the second device posture; and displaying the object corresponding to the object data on the display screen in response to the predetermined operation.

The above implementations will be described in detail below by taking a tablet computer including a touch-sensitive display screen and a wireless connection interface as the first electronic device and taking a smart phone as the second electronic device.

When the current device posture is a second device posture, an object corresponding to the object data is displayed on the first electronic device. The display process is specifically performed as follows.

Firstly, the first electronic device detects and acquires a predetermined operation for the second electronic device, for example, shaking the second electronic device.

Subsequently, the object corresponding to the object data, i.e., a particular file, is displayed in response to the predetermined operation. The object corresponding to the data object may be displayed from a predetermined position of the display screen of the first electronic device. For example, the object corresponding to the data object is displayed as appearing from the center of the display screen, or is displayed as gradually extending from one side of the display screen to the other side.

As an example, when the object data acquired by the tablet computer from the smart phone is a particular file itself, the object data includes a second parameter indicating that the smart phone is perpendicular to or approximately perpendicular to the display screen of the tablet computer. At this time, the tablet computer detects whether the smart phone acquires a predetermined operation, such as the smart phone being shaken. When the tablet computer detects that the smart phone acquires the predetermined operation, such as the smart phone being shaken, the tablet computer displays the particular file itself. The particular file itself may be displayed as appearing from the center of the display screen of the tablet computer, or may be displayed extending gradually from one side of the display screen of the tablet computer to the other side of the display screen.

As shown in FIG. 4, the smart phone is perpendicular to or approximately perpendicular to the display screen of the tablet computer. At this time, if the tablet computer detects that the smart phone is shaken, a particular file itself, such as a picture 4, will be displayed on a display screen of the tablet computer 3.

When the tablet computer detects that the smart phone is shaken continuously, picture files in the smart phone will be randomly displayed as appearing from the center of the display screen of the tablet computer. Stacks of files will be displayed until the shake is stopped. A first stack of files will appear upon the first shaking, and a second stack of files will appear upon the second shaking, and so on. The rhythm of shaking will influence how the files appear. That is, if the speed of shaking is fast, a large number of files will appear in a short time, and if the speed is slow, a small number of files will appear in a long time. After all the files in the smart phone have been moved to the tablet computer, if the smart phone continues to be shaken, a prompt that all the files have been transmitted will be issued in a form of voice or vibration.

After step S240 is completed, the information processing method according to the embodiment of the present application further includes a first step and a second step as follows.

First step: determining whether the second electronic device is in the second device posture while the object navigation interface is displayed on the display screen; and switching the display screen from displaying the object navigation interface to displaying an object corresponding to the object data when the second electronic device is in the second device posture.

Second Step:

detecting whether the second electronic device is in a predetermined spatial region; and displaying the object navigation interface when it is detected that the second electronic device is not in the predetermined spatial region.

The implementation of the first step will be described in detail below by taking a tablet computer including a touch-sensitive display screen and a wireless connection interface as the first electronic device and taking a smart phone as the second electronic device.

While the display screen of the first electronic device displays the object navigation interface, it is determined whether the device posture of the second electronic device is shifted from the first device posture to the second device posture.

When a determination result indicates that the device posture of the second electronic device has been shifted to the second device posture, the display screen of the first electronic device is switched from displaying the object navigation interface to displaying the object corresponding to the object data.

As an example, when the display screen of the tablet computer displays the object navigation interface, the parameter of the object data is a first parameter, and the smart phone is parallel to or approximately parallel to the display screen of the tablet computer, all files in the smart phone may be searched and displayed through the object navigation interface. At this time, if the smart phone is shifted to be perpendicular to or approximately perpendicular to the display screen of the tablet computer, the display screen of the tablet computer will be switched to displaying a particular file itself.

As shown in FIG. 5, when a display screen of a tablet computer 3 displays an object navigation interface 1, if the smart phone is shifted to be perpendicular to or approximately perpendicular to the display screen of the tablet computer 3, the display screen of the tablet computer 3 will be switched to displaying a particular file itself, such as a picture 4.

There are at least two schemes for the above switching operation.

The first scheme is that if the smart phone is shifted to be perpendicular to the display screen of the tablet computer and the smart phone is shaken, the object navigation interface on the display screen will vibrate along with the smart phone, and a particular file itself will fly out of the object navigation interface and be displayed near the object navigation interface.

The second switching mode is that the if the smart phone is shifted to be perpendicular to the display screen of the tablet computer and the smart phone is shaken, the particular file itself will be displayed as appearing from a predetermined position of the display screen, irrespective of the position of the object navigation interface. For example, the particular file will be displayed as appearing from the center of the display screen. At this time, for easier operation, the object navigation interface may continue to be displayed on the display screen. On the other side, for confidentiality and security, the object navigation interface may not be displayed on the display screen.

An implementation of second step will be described in detail below by taking a tablet computer including a touch-sensitive display screen and a wireless connection interface as the first electronic device and taking a smart phone as the second electronic device.

Firstly, the first electronic device detects whether the second electronic device is located within a predetermined spatial region. For example, the first electronic device detects whether the second electronic device is located within a spherical spatial region centered on the first electronic device with a radius of a predetermined length.

Subsequently, when the first electronic device detects that the second electronic device is not located within the predetermined spatial region, the object navigation interface is displayed. That is, the object navigation interface will be displayed as long as the second electronic device is not disconnected from the first electronic device.

As an example, the tablet computer detects whether the smart phone is located within a predetermined spatial region. For example, the tablet computer detects whether the smart phone is located within a spherical region centered on the tablet computer with a radius of 1 meter. For example, if a perpendicular distance between the smart phone and the tablet computer is 0.5 meter, the tablet computer will detect that the smart phone is located within a predetermined spatial region, irrespective of the device posture of the smart phone relative to the display screen of the tablet computer. The smart phone may be laid flat on the tablet computer, or may be picked up by a user to be in an upright state and be shaken above the tablet computer.

When it is detected that the smart phone is not located within the predetermined spatial region, the display screen of the smart phone displays the object navigation interface. That is, the object navigation interface will be displayed as long as the smart phone is not disconnected from the tablet computer. If the display screen has displayed the object navigation interface before the smart phone is moved out of the predetermined spatial region, the object navigation interface will continue to be displayed after the smart phone is moved out of the predetermined spatial region. If the display screen displays a particular file itself before the smart phone is moved out of the predetermined spatial region, the display screen will be switched from displaying the particular file itself to displaying the object navigation interface after the smart phone is moved out of the predetermined spatial region.

Based on the same inventive concept, the embodiments of the present invention further provide an electronic device. Since the principle of solving the problems of the electronic device is similar to that of the information processing method, the implementation of the electronic device can be learned with reference to the implementation of the information processing method, and the repeated parts will be omitted.

Figure 9:
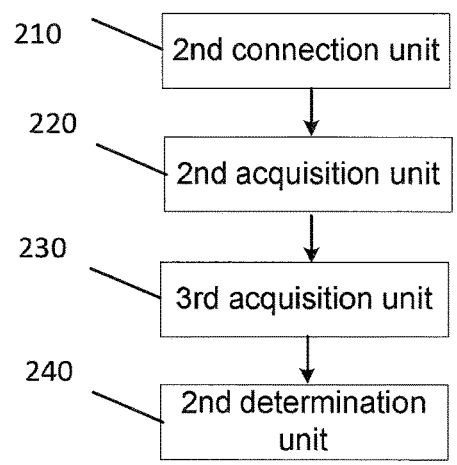
FIG. 9 is a block diagram of a first electronic device according to the second embodiment of the present application.

As shown in FIG. 9, a first electronic device including a display screen and a communication interface is provided, and the first electronic device further includes:

a second connection unit 210 configured to connect the first electronic device to a second electronic device through the communication interface;

a second acquisition unit 220 configured to acquire object data from the second electronic device;

a third acquisition unit 230 configured to acquire a current device posture of the second electronic device; and a second determination unit 240 configured to determine a display form for displaying the object data on the display screen according to the current device posture;

wherein when the current device posture is a first device posture, an object navigation interface is generated based on the object data and displayed on the display screen, so that each object on the second electronic device can be searched and displayed on the display screen through the object navigation interface; and when the current device posture is a second device posture, M objects are acquired based on the object data and displayed on the display screen, wherein M is a positive integer which is larger than or equal to 1;

wherein the first device posture is different from the second device posture, and each of the first device posture and the second device posture is a device posture of the second electronic device relative to the display screen.

Specifically, the second determination unit 240 further includes:

a second acquisition sub-unit configured to generate the object navigation interface based on the object data when the current device posture is the first device posture, and acquire a first position of the second electronic device relative to the first electronic device;

a second determination sub-unit configured to determine a display position of the object navigation interface on the display screen based on the first position; and a second display sub-unit configured to display the object navigation interface at the display position, so that the second electronic device blocks part of the object navigation interface.

Specifically, the second determination unit 240 further includes:

a second detection sub-unit configured to detect and acquire a predetermined operation when the current device posture is the second device posture; and a second response sub-unit configured to display an object corresponding to the object data on the display screen in response to the predetermined operation.

Alternatively, the first electronic device further includes:

a second determination unit configured to determine whether the second electronic device is in the second device posture when the object navigation interface is displayed on the display screen; and a second switching unit configured to switch the display screen from displaying the object navigation interface to displaying the object corresponding to the object data when the second electronic device is in the second device posture.

Alternatively, the first electronic device further includes:

a second detection unit configured to detect whether the second electronic device is located within a predetermined spatial region; and a second display unit configured to display the object navigation interface when it is detected that the second electronic device is not located within the predetermined spatial region.

Third Embodiment

The embodiment of the present application provides an information processing method in a first electronic device which comprises a communication interface. Specifically, the first electronic device may be a tablet computer, a large-screen display device etc. The communication interface may be a physical interface such as a USB interface, or may also be a communication interface such as Bluetooth, a wireless connection interface etc. The first electronic device, and the communication interface included in the first electronic device are described here only by way of example. In practice, electronic devices and communication interfaces with the same functions all fall within the protection scope of the present application. The embodiments will be described by taking a tablet computer including a wireless connection interface as an example of the first electronic device.

Figure 10:
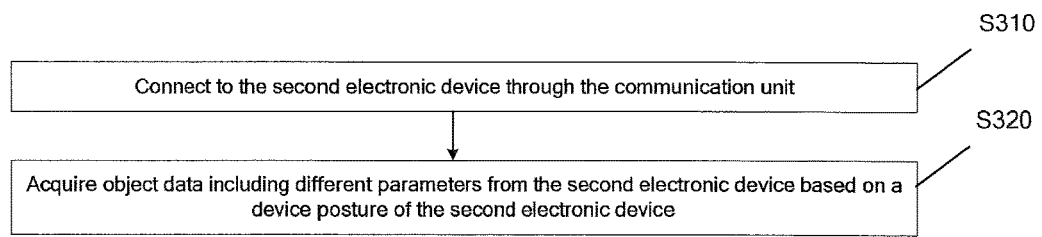
FIG. 10 is a flowchart of an information processing method according to a third embodiment of the present application.

As shown in FIG. 10, the information processing method of the present application specifically includes the following steps.

Step S310: connecting the first electronic device to the second electronic device through the communication interface;

Step S320: acquiring object data including different parameters from the second electronic device based on a device posture of the second electronic device;

The information processing method of the present application is applied for data transfer between electronic devices. In order to complete the data transfer, the first electronic device is firstly connected to the second electronic device. The second electronic device may be a smart phone, a tablet computer, a notebook etc., which is not limited in the present application. The embodiment will be described here by taking a smart phone as the second electronic device.

Firstly, a specific implementation of step S310 will be described in detail below.

The information processing method of the present application is applied for data transfer between electronic devices. In order to complete the data transfer, the first electronic device is firstly connected to the second electronic device. The second electronic device may be a smart phone, a tablet computer, a notebook etc., which is not limited by the present application. The embodiments will be described here by taking a smart phone as the second electronic device.

As an example, a specific implementation of the step S310 is that the smart phone is connected to the tablet computer through a USB interface, Bluetooth or a wireless connection interface.

After step S310 is completed, step S320 of acquiring object data including different parameters from the second electronic device based on a device posture of the second electronic device will be performed in the information processing method of the present application.

The implementation of step S320 will be described in detail below by taking a tablet computer including a wireless connection interface as the first electronic device and taking a smart phone as the second electronic device.

Object data including different parameters is acquired from the second electronic device by the first electronic device based on a device posture of the second electronic device. That is, as the device postures of the second electronic device are different, contents transmitted to the first electronic device are different, i.e., the object data including different parameters are transmitted to the first electronic device.

As an example, when the smart phone is parallel to or approximately parallel to the tablet computer, the object data acquired by the tablet computer from the smart phone is object data including a first parameter, i.e., a folder directory in the smart phone is acquired; and when the smart phone is perpendicular to or approximately perpendicular to the tablet computer, the object data acquired by the tablet computer from the smart phone is object data including a second parameter, i.e., a particular file itself in the smart phone is acquired.

Based on the same inventive concept, the embodiments of the present invention further provide an electronic device. Since the principle of solving the problems of the electronic device is similar to that of the information processing method, the implementation of the electronic device can be learned with reference to the implementation of the information processing method, and the repeated parts will be omitted.

Figure 11:
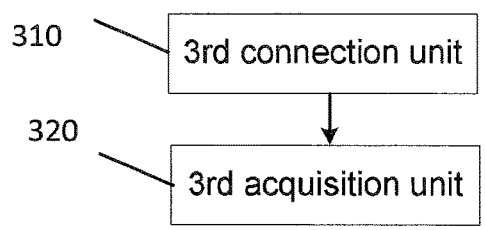
FIG. 11 is a block diagram of a first electronic device according to the third embodiment of the present application.

As shown in FIG. 11, a first electronic device which comprises a communication interface is provided, and the first electronic device further comprises:

a third connection unit 310 configured to connect the first electronic device to a second electronic device through the communication interface; and a third acquisition unit 320 configured to acquire object data including different parameters from the second electronic device based on a device posture of the second electronic device.

Fourth Embodiment

The embodiment of the present application provides an information processing method in a first electronic device which comprises a display screen and a communication interface. Specifically, the first electronic device may be a tablet computer, a large-screen display device etc. The display screen may be a touch-sensitive display screen, a non-touch-sensitive display screen etc. The communication interface may be a physical interface such as a USB interface, or may also be a communication interface such as Bluetooth, a wireless connection interface etc. The first electronic device, and the display screen and the communication interface included in the first electronic device are described here only by way of example. In practice, electronic devices, display screens and communication interfaces with the same functions all fall within the protection scope of the present application. The embodiments will be described by taking a tablet computer including a touch-sensitive display screen and a wireless connection interface as an example of the first electronic device.

Figure 12:
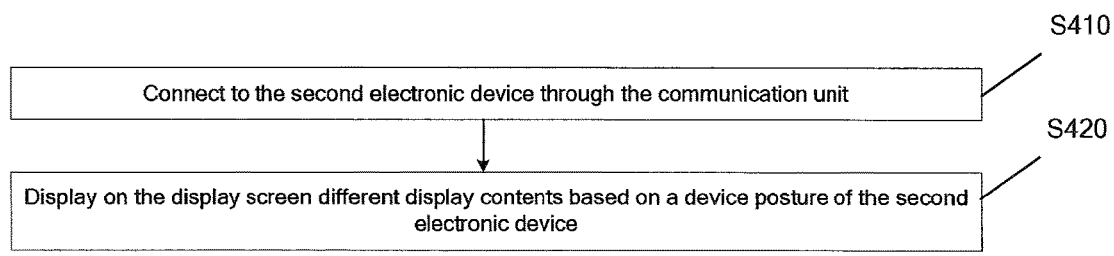
FIG. 12 is a flowchart of an information processing method according to a fourth embodiment of the present application.

As shown in FIG. 12, the information processing method of the present application specifically includes the following steps.

Step S410: connecting the first electronic device to the second electronic device through the communication interface;

Step S420: displaying on the display screen different display contents based on a device posture of the second electronic device.

Firstly, a specific implementation of step S410 will be described in detail below.

The information processing method of the present application is applied for data transfer between electronic devices. In order to complete the data transfer, the first electronic device is firstly connected to the second electronic device. The second electronic device may be a smart phone, a tablet computer, a notebook etc., which is not limited in the present application. The embodiments will be described here by taking a smart phone as the second electronic device.

As an example, a specific implementation of step S410 is that the smart phone is connected to the tablet computer through a USB interface, Bluetooth or a wireless connection interface.

After step S410 is completed, step S420 of displaying on the display screen different display contents based on a device posture of the second electronic device will be performed in the information processing method of the present application.

The implementation of step S420 will be described in detail below by taking a tablet computer including a touch-sensitive display screen and a wireless connection interface as the first electronic device and taking a smart phone as the second electronic device.

Different display contents are displayed on the display screen of the first electronic device based on device postures of the second electronic device. That is, as the device postures of the second electronic device are different, the display screen of the first electronic device displays different display contents, i.e., when the device postures are different, the contents displayed by the first electronic device are different.

As an example, when the smart phone is parallel to or approximately parallel to the tablet computer, the content displayed by the tablet is the object navigation interface, so as to enable each object on the second electronic device to be searched and displayed on the display screen of the first electronic device through the object navigation interface at the first electronic device. That is, the object navigation interface displays the file types of all the files stored in the second electronic device, and all the file types stored in the second electronic device may be searched and displayed through the object navigation interface. When the smart phone is perpendicular to or approximately perpendicular to the tablet computer, the content displayed by the tablet is a particular file itself stored in the smart phone.

Based on the same inventive concept, the embodiments of the present invention further provide an electronic device. Since the principle of solving the problems of the electronic device is similar to that of the information processing method, the implementation of the electronic device can be learned with reference to the implementation of the information processing method, and the repeated parts will be omitted.

Figure 13:
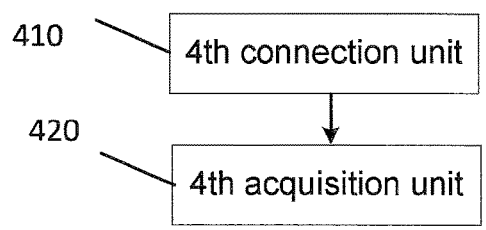
FIG. 13 is a block diagram of a first electronic device according to the fourth embodiment of the present application.

As shown in FIG. 13, a first electronic device including a display screen and a communication interface is provided, and the first electronic device further includes:

a fourth connection unit 410 configured to connect the first electronic device to a second electronic device through the communication interface; and a third display unit 420 configured to display, on the display screen, different display contents based on a device posture of the second electronic device.

One or more of the solutions according to the embodiments of the present application have at least the following effects or advantages.

1. The first electronic device is connected to the second electronic device using a communication interface, object data is acquired from the second electronic device, and according to a parameter of the object data, each object on the second electronic device is acquired and displayed through an object navigation interface, or an object corresponding to the object data is acquired and displayed directly. This solves the problem in the conventional technology that there is only a single approach for data transfer, and provides a plurality of approaches for data transfer.

2. The first electronic device is connected to the second electronic device using a communication interface, object data is acquired from the second electronic device, and according to a current device posture of the second electronic device, each object on the second electronic device is acquired and displayed through an object navigation interface, or an object corresponding to the object data is acquired and displayed directly. This solves the problem in the conventional technology that there is only a single approach for data transfer, and provides a plurality of approaches for data transfer.

3. The first electronic device is connected to the second electronic device using a communication interface, and object data including different parameters is acquired from the second electronic device based on a device posture of the second electronic device. Therefore, the first electronic device can be controlled to acquire different transmitted data according to the device posture of the second electronic device.

4. The first electronic device is connected to the second electronic device using a communication interface, and different contents are displayed on the display screen of the first electronic device based on a device posture of the second electronic device. Therefore, the first electronic device can be controlled to display different display contents according to the device posture of the second electronic device.

Those skilled in the art should appreciate that the embodiments of the present invention can be provided as methods, systems, or computer program products. Therefore, forms such as hardware-only embodiments, software-only embodiments, or embodiments combining software and hardware can be used in the present invention. In addition, forms such as a computer program product which is implemented on one or more of computer usable storage media (including but not limited to a disk memory, a CD-ROM, an optical memory etc.) with computer usable program codes can be used in the present invention.

The present invention is described with reference to the flowcharts and/or block diagrams of the methods, devices (systems) and computer program products according to the embodiments of the present invention. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture including instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

Specifically, an information processing method according to the first embodiment of the present application is applied in a first electronic device which comprises a display screen and a communication interface. Computer program instructions corresponding to the information processing method may be stored on a storage medium such as an optical disk, a hard disk, a USB drive etc., and when the computer program instructions stored in the storage medium which correspond to the information processing method are read or executed by an electronic device, the following steps are performed:

connecting the first electronic device to a second electronic device through the communication interface;

acquiring object data from the second electronic device; and determining a display form for displaying the object data on the display screen according to a parameter of the object data;

wherein when the parameter is a first parameter representing that the second electronic device is in a first device posture, an object navigation interface is generated based on the object data and displayed on the display screen, wherein through the object navigation interface, each object on the second electronic device can be searched and displayed on the display screen, and when the parameter is a second parameter representing that the second electronic device is in a second device posture, an object corresponding to the object data is displayed on the display screen based the object data;

wherein the first device posture is different from the second device posture, and each of the first and second device postures is a device posture of the second electronic device relative to the display screen.

Alternatively, when computer instructions stored in the storage medium, which correspond to the step stating that an object navigation interface is generated based on the object data and the object navigation interface is displayed on the display screen when the parameter is a first parameter representing that the second electronic device is in a first device posture, are executed, the following steps are performed:

generating the object navigation interface based on the object data when the parameter is a first parameter representing that the second electronic device is in a first device posture;

acquiring a first position of the second electronic device relative to the first electronic device;

determining a display position of the object navigation interface on the display screen based on the first position; and displaying the object navigation interface at the display position, so that the second electronic device blocks part of the object navigation interface.

Alternatively, when computer instructions stored in the storage medium, which correspond to the step stating that an object corresponding to the object data is displayed on the display screen based on the object data when the parameter is the second parameter, are executed, the following steps are performed:

detecting and acquiring a predetermined operation when the parameter is the second parameter; and displaying the object corresponding to the object data on the display screen in response to the predetermined operation.

Alternatively, the storage medium further stores some other computer instructions, which are executed after computer instructions corresponding to the step of determining a display form for displaying the object data on the display screen according to a parameter of the object data are executed, and the following steps are performed when said some other computer instructions are executed:

determining whether the second electronic device is in the second device posture when the object navigation interface is displayed on the display screen; and switching the display screen from displaying the object navigation interface to displaying the object corresponding to the object data when the second electronic device is in the second device posture.

Alternatively, the storage medium further stores some other computer instructions, which are executed after computer instructions corresponding to the step of determining a display form for displaying the object data on the display screen according to a parameter of the object data are executed, and the following steps are performed when said some other computer instructions are executed:

detecting whether the second electronic device is located within a predetermined spatial region; and displaying the object navigation interface when it is detected that the second electronic device is not located within the predetermined spatial region.

Specifically, an information processing method according to the second embodiment of the present application is applied in a first electronic device which comprises a display screen and a communication interface. Computer program instructions corresponding to the information processing method may be stored on a storage medium such as an optical disk, a hard disk, a USB drive etc., and when the computer program instructions stored in the storage medium which correspond to the information processing method are read or executed by an electronic device, the following steps are performed:

connecting the first electronic device to a second electronic device through the communication interface;

acquiring object data from the second electronic device;

acquiring a current device posture of the second electronic device; and determining a display form for displaying the object data on the display screen according to the current device posture;

wherein when the current device posture is a first device posture, an object navigation interface is generated based on the object data and displayed on the display screen, wherein through the object navigation interface, each object on the second electronic device can be searched and displayed on the display screen; and when the current device posture is a second device posture, M objects are acquired based on the object data and displayed on the display screen, wherein M is a positive integer larger than or equal to 1;

wherein the first device posture is different from the second device posture, and each of the first and second device postures is a device posture of the second electronic device relative to the display screen.

Alternatively, when computer instructions stored in the storage medium, which correspond to the step stating that an object navigation interface is generated based on the object data and the object navigation interface is displayed on the display screen when the current device posture is a first device posture, are executed, the following steps are performed:

generating the object navigation interface based on the object data when the current device posture is the first device posture;

acquiring a first position of the second electronic device relative to the first electronic device;

determining a display position of the object navigation interface on the display screen based on the first position; and displaying the object navigation interface at the display position, so that the second electronic device blocks part of the object navigation interface.

Alternatively, when computer instructions stored in the storage medium, which correspond to the step stating that M objects are acquired based on the object data and the M objects are displayed on the display screen when the current device posture is a second device posture, are executed, the following steps are performed:

detecting and acquiring a predetermined operation when the current device posture is the second device posture; and displaying an object corresponding to the object data on the display screen in response to the predetermined operation.

Alternatively, the storage medium further stores some other computer instructions, which are executed after computer instructions corresponding to the step of determining a display form for displaying the object data on the display screen according to the current device posture are executed, and the following steps are performed when said some other computer instructions are executed:

determining whether the second electronic device is in the second device posture when the object navigation interface is displayed by the first electronic device; and switching the display screen from displaying the object navigation interface to displaying the object corresponding to the object data when the second electronic device is in the second device posture.

Alternatively, the storage medium further stores some other computer instructions, which are executed after computer instructions corresponding to the step of determining a display form for displaying the object data on the display screen according to the current device posture are executed, and the following steps are performed when said some other computer instructions are executed:

detecting whether the second electronic device is located within a predetermined spatial region; and displaying the object navigation interface when it is detected that the second electronic device is not located within the predetermined spatial region.

Specifically, an information processing method according to the third embodiment of the present application is applied in a first electronic device which comprises a communication interface. Computer program instructions corresponding to the information processing method may be stored on a storage medium such as an optical disk, a hard disk, a USB drive etc., and when the computer program instructions stored in the storage medium which correspond to the information processing method are read or executed by an electronic device, the following steps are performed:

connecting the first electronic device to a second electronic device through the communication interface; and acquiring object data including different parameters from the second electronic device based on a device posture of the second electronic device.

Specifically, an information processing method according to the fourth embodiment of the present application is applied in a first electronic device which comprises a display screen and a communication interface. Computer program instructions corresponding to the information processing method may be stored on a storage medium such as an optical disk, a hard disk, a USB drive etc., and when the computer program instructions stored in the storage medium which correspond to the information processing method are read or executed by an electronic device, the following steps are performed:

connecting the first electronic device to a second electronic device through the communication interface; and displaying, on the display screen, different display contents based on a device posture of the second electronic device.

While the preferred embodiments of the present invention have been described, those skilled in the art can make further modifications and changes to these embodiments based on the fundamental inventive concept of the present invention. Therefore, the claims as attached are intended to cover the preferred embodiments and all the modifications and changes that fall within the scope of the present invention.

Obviously, various modifications and variants can be made to the present invention by those skilled in the art without departing from the spirit and scope of the present invention. Therefore, these modifications and variants are to be encompassed by the present invention if they fall within the scope of the present invention as defined by the claims and their equivalents.

What is claimed is:

1. An information processing method applied in a first electronic device which comprises a display screen and a communication interface, the method comprising:
   connecting to a second electronic device through the communication interface;
   acquiring object data from the second electronic device; and
   determining a display form for displaying the object data on the display screen according to a parameter of the object data, wherein the parameter of the object data represents that posture of the first electronic device relative to the second electronic device;
   wherein when the object data is a folder directory and the parameter is a first parameter representing that the second electronic device is in a first device posture relative to a position of the display screen, an object navigation interface is generated based on the object data and displayed on the display screen of the first electronic device, wherein the object navigation interface displays object types of one or more objects stored in the second electronic device,
   when the object data is a file itself and the parameter is a second parameter representing that the second electronic device is in a second device posture relative to a position of the display screen and different from the first device posture, an object corresponding to the object data is displayed on the display screen based on the object data, and
   when the object navigation interface is displayed on the display screen, if the second electronic device is changed to the second device posture, the display screen is switched from displaying the object navigation interface to displaying the object corresponding to the object data.

2. The method of claim 1, wherein when the parameter is a first parameter representing that the second electronic device is in the first device posture, the object navigation interface is generated based on the object data and displayed on the display screen by:
   generating the object navigation interface based on the object data when the second electronic device is in the first device posture;
   acquiring a first position of the second electronic device relative to the first electronic device; determining a display position of the object navigation interface on the display screen based on the first position; and
   displaying the object navigation interface at the display position so that the second electronic device blocks a user from observing the whole of the object navigation interface from a top view.

3. The method of claim 1, wherein when the parameter is a second parameter representing that the second electronic device is in a second device posture, the object corresponding to the object data is displayed on the display screen based on the object data by:
   detecting and acquiring a predetermined operation; and
   displaying the object corresponding to the object data on the display screen in response to the predetermined operation.

4. The method of claim 1, wherein after determining a display form for displaying the object data on the display screen according to a parameter of the object data, the method further comprises:
   judging whether the second electronic device is in the second device posture when the object navigation interface is displayed on the display screen; and
   switching the display screen from displaying the object navigation interface to displaying the object corresponding to the object data when the second electronic device is in the second device posture.

5. The method of claim 1, wherein after determining a display form for displaying the object data on the display screen according to a parameter of the object data, the method further comprises:
   detecting whether the second electronic device is located within a predetermined spatial region; and
   displaying the object navigation interface when it is detected that the second electronic device is not located within the predetermined spatial region.

6. An information processing method applied in a first electronic device which comprises a display screen and a communication interface, the method comprising:
   connecting to a second electronic device through the communication interface;
   acquiring object data from the second electronic device; acquiring a current device posture of the second electronic device; and
   determining a display form for displaying the object data on the display screen according to the current device posture;
   wherein when the object data is a folder directory and the current device posture is a first device posture being a position of the second electronic device relative to a position of the display screen, an object navigation interface is generated based on the object data and displayed on the display screen of the first electronic device, wherein the object navigation interface displays object types of one or more objects stored in the second electronic device, and all the object types stored in the second electronic device can be searched and displayed through the object navigation interface of the first electronic device, when the object data is a file itself and the current device posture is a second device posture being a position of the second electronic device relative to a position of the display screen and different from the first device posture, M objects are acquired based on the object data and displayed on the display screen, wherein M is a positive integer larger than or equal to 1, and when the object navigation interface is displayed on the display screen, if the second electronic device is changed to the second device posture, the display screen is switched from displaying the object navigation interface to displaying the object corresponding to the object data.

7. The method of claim 6, wherein when the current device posture is a first device posture, the object navigation interface is generated based on the object data and displayed on the display screen by:

generating the object navigation interface based on the object data when the current device posture is the first device posture; acquiring a first position of the second electronic device relative to the first electronic device; determining a display position of the object navigation interface on the display screen based on the first position; and displaying the object navigation interface at the display position, so that the second electronic device blocks a user from observing the whole of the object navigation interface from a top view.

8. The method of claim 6, wherein when the current device posture is a second device posture, the M objects are acquired based on the object data and displayed on the display screen by:

detecting and acquiring a predetermined operation when the current device posture is the second device posture; and displaying an object corresponding to the object data on the display screen in response to the predetermined operation.

9. The method of claim 6, wherein after determining a display form for displaying the object data on the display screen according to the current device posture, the method further comprises:

judging whether the second electronic device is in the second device posture when the object navigation interface is displayed on the display screen; and switching the display screen from displaying the object navigation interface to displaying the object corresponding to the object data when the second electronic device is in the second device posture.

10. The method of claim 6, wherein after determining a display form for displaying the object data on the display screen according to the current device posture, the method further comprises:

detecting whether the second electronic device is located within a predetermined spatial region; and displaying the object navigation interface when it is detected that the second electronic device is not located within the predetermined spatial region.

11. A first electronic device comprising a display screen and a communication interface, wherein the first electronic device further comprises:

a connection unit configured to connect to a second electronic device through the communication interface;

a first acquisition unit configured to acquire object data from the second electronic device;

a second acquisition unit configured to acquire a current device posture of the second electronic device; and a determination unit configured to determine a display form for displaying the object data on the display screen according to the current device posture;

wherein when the object data is a folder directory and the current device posture is a first device posture being a position of the second electronic device relative to a position of the display screen, an object navigation interface is generated based on the object data and displayed on the display screen of the first electronic device, wherein the object navigation interface displays object types of one or more objects stored in the second electronic device, when the object data is a file itself and the current device posture is a second device posture being a position of the second electronic device relative to a position of the display screen, M objects are acquired based on the object data and displayed on the display screen, wherein M is a positive integer larger than or equal to 1, and when the object navigation interface is displayed on the display screen, if the second electronic device is changed to the second device posture, the display screen is switched from displaying the object navigation interface to displaying the object corresponding to the object data.

12. The first electronic device of claim 11, wherein the determination unit further comprises:

an acquisition sub-unit configured to generate the object navigation interface based on the object data when the current device posture is the first device posture, and acquire a first position of the second electronic device relative to the first electronic device;

a determination sub-unit configured to determine a display position of the object navigation interface on the display screen based on the first position; and a display sub-unit configured to display the object navigation interface at the display position, so that the second electronic device blocks a user from observing the whole of the object navigation interface from a top view.

13. The first electronic device of claim 11, wherein the determination unit further comprises:

a detection sub-unit configured to detect and acquire a predetermined operation when the current device posture is the second device posture; and a response sub-unit configured to display an object corresponding to the object data on the display screen in response to the predetermined operation.

14. The first electronic device of claim 11, further comprising:

a judging unit configured to judge whether the second electronic device is in the second device posture when the object navigation interface is displayed by the first electronic device; and a switching unit configured to switch the display screen from displaying the object navigation interlace to displaying the object corresponding to the object data when the second electronic device is in the second device posture.

15. The first electronic device of claim 11, further comprising:

a detection unit configured to detect whether the second electronic device is located within a predetermined spatial region; and a display unit configured to display the object navigation interface when it is detected that the second electronic device is not located within the predetermined spatial region.

\* \* \* \* \*